(12) United States Patent
Blase et al.

(10) Patent No.: US 7,439,446 B2
(45) Date of Patent: Oct. 21, 2008

(54) CABLE-ROUTING DEVICE

(75) Inventors: Frank Blase, Bergisch Gladbach (DE); Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 10/552,427

(22) PCT Filed: Apr. 2, 2004

(86) PCT No.: PCT/DE2004/000721

§ 371 (c)(1),
(2), (4) Date: Jul. 24, 2006

(87) PCT Pub. No.: WO2004/093279

PCT Pub. Date: Oct. 28, 2004

(65) Prior Publication Data

US 2006/0260833 A1 Nov. 23, 2006

(30) Foreign Application Priority Data

Apr. 7, 2003 (DE) .............................. 203 05 679 U

(51) Int. Cl.
*H02G 3/04* (2006.01)
*H02G 3/00* (2006.01)

(52) U.S. Cl. .......................... 174/95; 174/70 R; 174/19; 174/69; 174/135; 174/480; 248/49; 248/61; 248/65; 379/326; 385/134; 385/135

(58) Field of Classification Search ............... 174/70 R, 174/95, 19, 135, 68.1, 69, 480, 490; 385/134, 385/135; 379/326; 248/49, 61, 65

See application file for complete search history.

(56) References Cited

U.S. PATENT DOCUMENTS 4,771,500 A * 9/1988 Kovacs .................... 15/104.33

(Continued)

FOREIGN PATENT DOCUMENTS

DE 90 17 373 4/1991

OTHER PUBLICATIONS

Translation of International Preliminary Report on Patentability received in corresponding priority application PCT/DE2004/000721.

*Primary Examiner*—Dhiru R Patel
*Assistant Examiner*—David M Sinclair
(74) *Attorney, Agent, or Firm*—Grossman Tucker Perreault & Pfleger, PLLC

(57) ABSTRACT

The invention relates to a cable-routing device including links that are open at the ends, joined together in pivoting fashion and can be angled-relative to each other in at least two directions, said links being arranged one behind the other in the longitudinal direction of the cable-routing device and forming at least one guide channel by means of guide elements located radially outwards, where tensile force-absorbing pivoting joints are located between links joined together in pivoting fashion within the cable-routing device and the links each display corresponding joint elements. In order to provide a cable-routing device that is capable of absorbing high tensile forces and/or thrust, especially in the longitudinal direction, and whose assembly and/or disassembly is facilitated, at least one pivoting joint (6, 7) is designed in such a way that, in order to form and/or disconnect the pivoting joint, the respective links (2) and/or joint elements to be joined to one another and/or disconnected from one another can be joined and/or separated in a direction (8) that encloses an angle relative to the longitudinal axis (9) of the cable-routing device.

17 Claims, 4 Drawing Sheets

U.S. PATENT DOCUMENTS 5,824,957 A * 10/1998 Holshausen ................. 174/95
6,042,155 A *  3/2000 Lockwood ................. 285/264
6,427,980 B2 *  8/2002 Blase ................. 254/134.3 FT

* cited by examiner

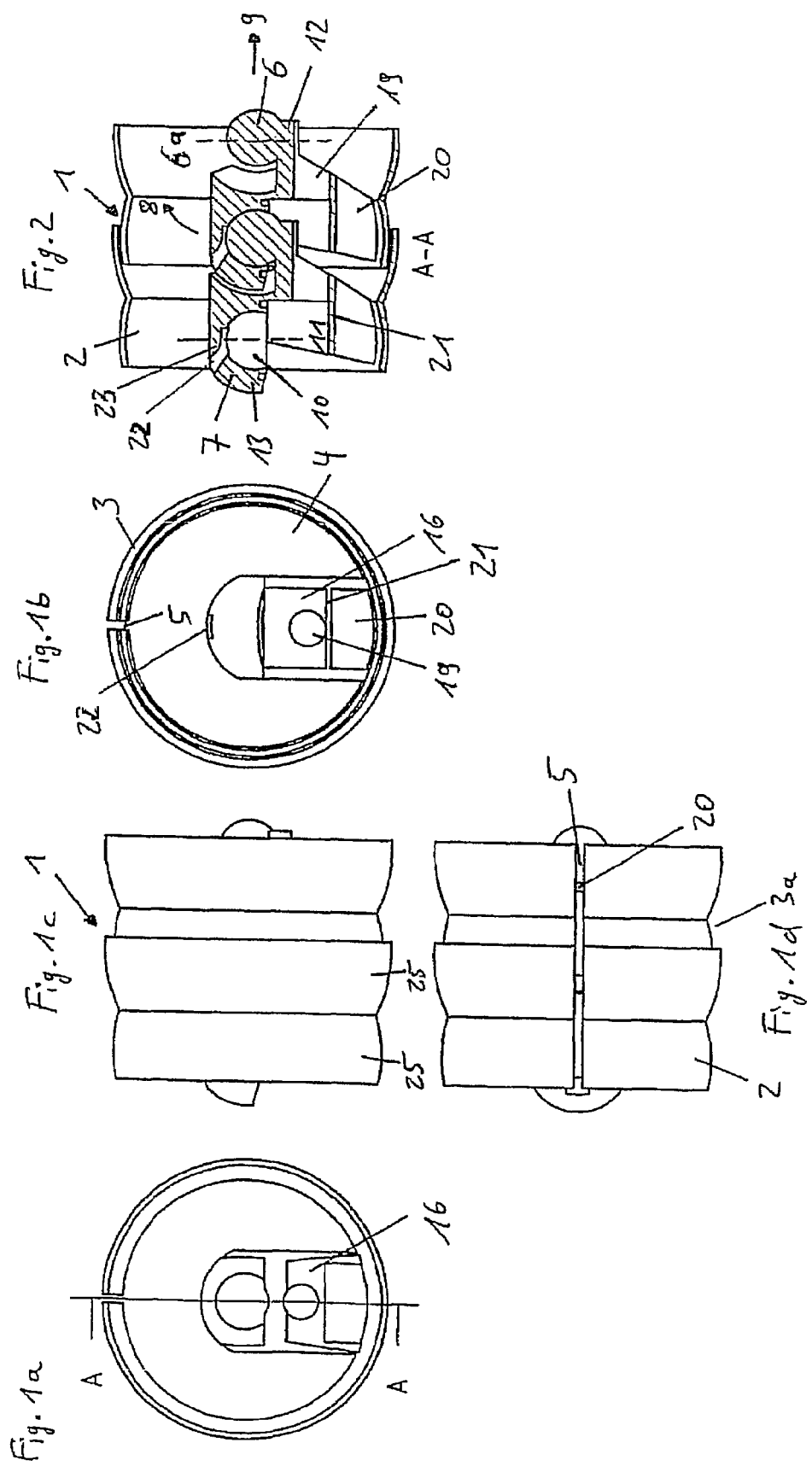

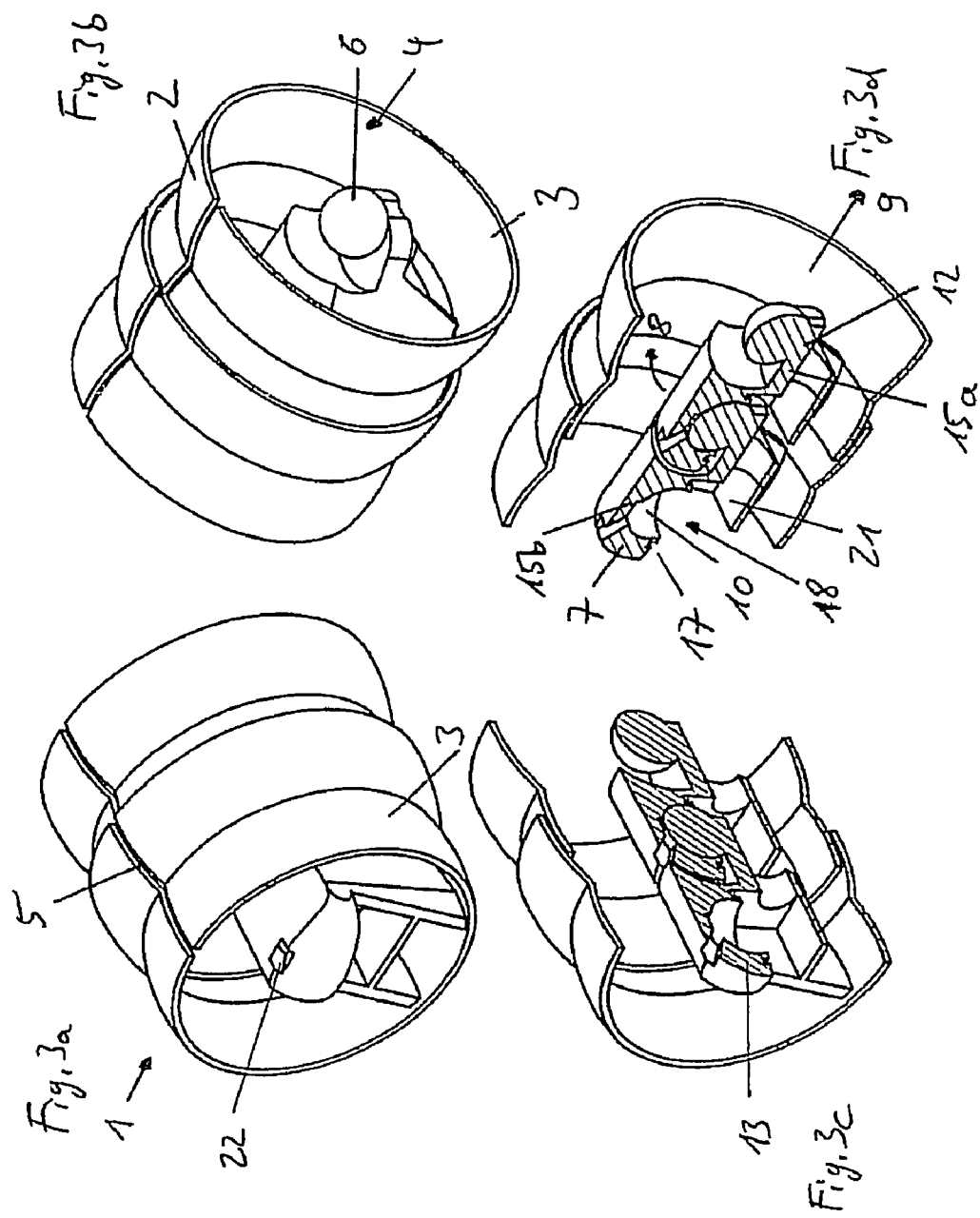

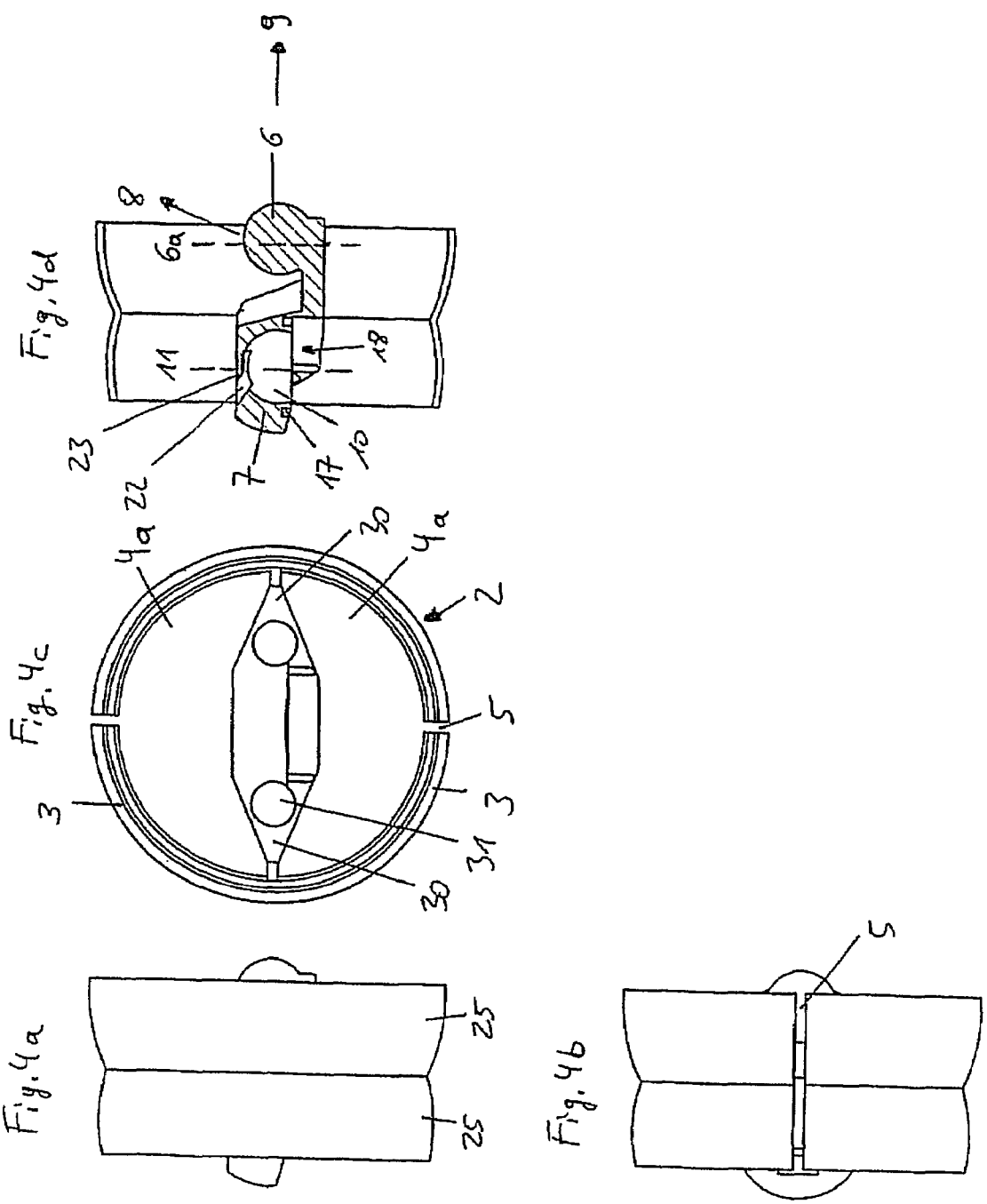

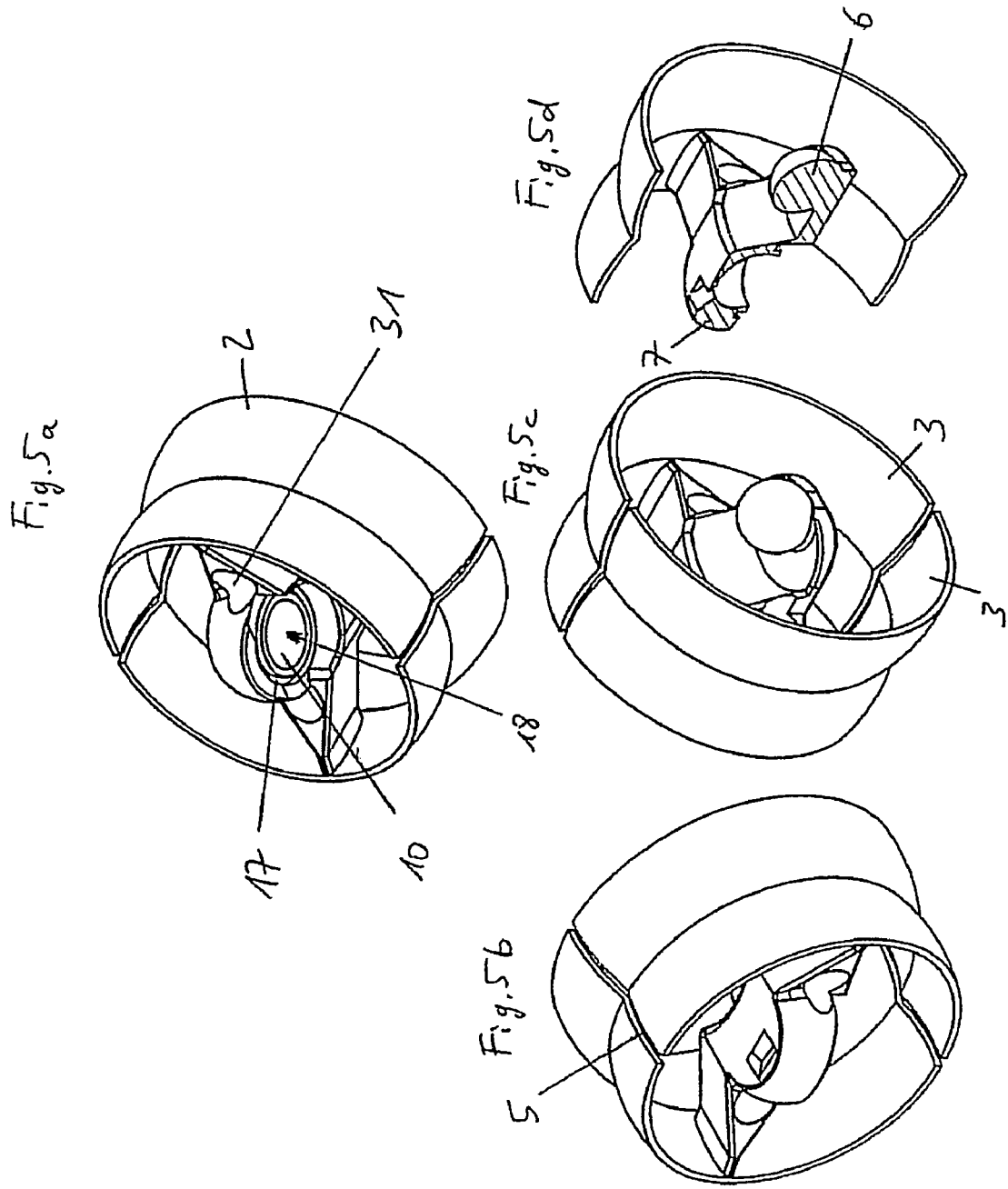

CABLE-ROUTING DEVICE

BACKGROUND OF THE INVENTION

The invention relates to a cable-routing device comprising links that are open at the ends, joined together in pivoting fashion and can be angled relative to each other in at least two directions, said links being arranged one behind the other in the longitudinal direction of the cable-routing device and forming at least one guide channel by means of guide elements located radially outwards, where tensile force-absorbing pivoting joints are located between links joined together in pivoting fashion within the cable-routing device and where the links each display corresponding joint elements.

Cable-routing devices of this kind are used for guiding cables, media lines, hoses and the like, especially in robots.

1. Field of Invention

In generic cable-routing devices, and also in the cable-routing device according to the invention, the pivoting joints are located within the cable-routing device, i.e. at a radial distance from the respective outer guide elements; the pivoting joints are preferably located at the centre of the cable-routing device, i.e. in the middle between at least two opposite guide elements located radially outwards. This preferably applies to all pivoting joints of the cable-routing device. Consequently, at least part of the area of a guide channel for accommodating cables, lines and the like is provided between the pivoting joints and the radially most outward-lying guide elements. In known cable-routing devices, the links are joined together in pivoting fashion, where a flexible retaining element in the form of a wire rope or the like is provided, which is passed through the pivoting joints and extends over the entire length of the cable-routing device in order to hold the cable-routing device together. As a result, the cable-routing device has to be disassembled almost completely by disconnecting and removing the wire rope, at least from one end, e.g. in order to permit replacement of damaged links located a distance away from the end areas. To assemble the chain, all the links facing one end of the cable-routing device, starting from the damaged link, then have to be fitted on the wire rope again. Consequently, the assembly and disassembly of the cable-routing device is a very time-consuming process. However, the use of cable-routing devices of this kind without wire ropes often fails due to the fact that the cable-routing device can then no longer absorb sufficiently high tensile forces.

2. Description of Related Art

The object of the invention is to provide a cable-routing device that is capable of absorbing high tensile forces and/or thrust, especially in the longitudinal direction, and whose assembly and/or disassembly is facilitated.

The object is solved by a cable-routing device in which at least one pivoting joint is designed in such a way that, in order to form and/or disconnect the pivoting joint, the respective links and/or joint elements to be joined to one another and/or disconnected from one another can be joined and/or separated in a direction that encloses an angle relative to the longitudinal axis of the cable-routing device. The movement of the joint elements for connecting and/or disconnecting the pivoting joint preferably takes place independently of their fastening areas, in such a way that, for example, the joint elements as a whole can be moved in the specified direction, possibly together with the fastening areas of the same, and not only the directly acting fastening areas, such as the actual snap-in connecting elements. Thus, disconnection of the pivoting joint, e.g. release of the snap-in elements of the same, requires movement of the joint elements and/or the corresponding links in a direction that differs from the longitudinal direction of the cable-routing device. Preferably, several or all of the pivoting joints of the cable-routing device are designed in this way. As a result of this, when a tensile force or thrust is applied to the cable-routing device in its longitudinal direction, the direction of flow of the force does not lie in the direction in which the links are intended to be joined to one another and/or separated from one another in order to form and/or disconnect a pivoting joint. The pivoting joint is therefore capable of absorbing particularly high tensile forces. Relatively simple disconnection and/or joining of the links is, however, possible if the links can be moved towards each other or away from each other in a direction that differs from the longitudinal axis of the cable-routing device. To this end, the joint elements can be provided with engaging undercuts, e.g. in the form of hook-shaped areas. In this context, the longitudinal direction of the cable-routing device is defined by the longitudinal direction of the cable-routing device when stretched out.

Connection and/or disconnection of the links can essentially be achieved by means of a linear movement transverse to the longitudinal axis of the cable-routing device, a pivoting movement or a combined movement. In particular, the respective indication of the connecting and/or disconnecting direction can refer to the immediate procedure for connecting the pivoting joint and/or disconnecting the same. The procedure for connecting or disconnecting the pivoting joint can, in particular, commence when the joint elements collide with each other, or when a force has to be overcome to disconnect the joint elements in the longitudinal direction of the cable-routing device. To connect the pivoting joint, the links can also initially be moved towards each other essentially in the longitudinal direction of the cable-routing device, after which deflection or a pivoting movement relative to this direction can be carried out in order to connect the pivoting joint, without this sequence of movements restricting the movement of the links towards each other. The pivoting joints between immediately adjacent links that absorb tensile forces in the longitudinal direction of the cable-routing device preferably act by means of fastening means that can be disconnected or actuated independently of some or all of the other pivoting joints.

As a result of locating the pivoting joints within the cable-routing device, they are more or less shielded on the outside by the guide elements, meaning that the pivoting joints cannot be impaired by unintentional external intervention or influences, in addition to which, the outer side of the cable-routing device can be designed independently of the pivoting joints. Moreover, the pivoting joints located inside the cable-routing device can be specially adapted to the respective requirements, this not always being possible in the case of pivoting joints located in a radially outward position on the links, particularly when high forces acting on the cable-routing device have to be taken into account, especially high tensile forces or lateral forces.

The joint elements of interconnected links can be designed as a joint body, particularly a joint ball, and a corresponding joint body receptacle, particularly a ball socket. A ball-and-socket joint of this kind permits spherical movement of the links joined together in pivoting fashion relative to each other, at least within a given range. Where appropriate, the movement of the links can, however, also be further restricted in one or more directions. Where appropriate, the joint body can also be designed more as a hinge pin and the joint body receptacle as a hinge sleeve, whereby hinged movement in one plane can essentially be enabled.

The pivoting joint is preferably designed in such a way that the direction for connecting the joint elements to form the pivoting joint and/or for disconnecting the pivoting joint encloses an angle of 45° to 135°, preferably 60° to 120°, particularly approx. 90°, with the longitudinal axis of the cable-routing device. A similar design can also apply, alternatively or simultaneously, to the direction for connecting or disconnecting the links themselves. This adequately ensures that the connecting and disconnecting direction of the links or the joint elements differs from the longitudinal direction of the cable-routing device, meaning that high tensile forces can be absorbed.

Preferably, the longitudinal axis of the joint body, which can run through its fastening area, lies at an angle to the longitudinal axis of the cable-routing device, where, in the case of a ball-and-socket joint, the longitudinal axis of the joint body can be defined by the centre point of the ball and the centre of the fastening area of the joint ball. The axis of the joint body receptacle can be defined by the axis of symmetry of the receptacle or by the direction of insertion of the joint body into the receptacle when the joint body is in contact with the receptacle. The axis of the joint body and/or the joint body receptacle can enclose an angle of 45° to 135°, preferably 60° to 120°, particularly approx. 90°, with the longitudinal axis of the cable-routing device, without being restricted to this.

The positive connection is preferably designed in such a way that a positive fit, preferably a positive fit extending over the entire circumference in a plane including the longitudinal axis of the cable-routing device, is achieved in the direction of traction or the longitudinal direction of the cable-routing device.

The joint elements are preferably each supported by supports or areas of the respective link that can be designed as web-like areas or as bases, where the web-like areas and/or the top sides of the bases are offset relative to each other in a direction perpendicular to the longitudinal axis of the cable-routing device. The joint elements to be connected are thus supported from different directions. The bases are preferably arranged in such a way that they are aligned with each other in the longitudinal direction of the cable-routing device. In this context, the bases can display a width that essentially corresponds to, or exceeds, the width of the joint element provided with the joint body receptacle, thus providing a broad supporting surface.

To facilitate positive connection, especially snap-in connection, at least one recess or other area of thinner material can be provided adjacent to the receiving opening for insertion of the corresponding joint element, extending in its longitudinal direction at least partially, or completely, around the circumference of the receptacle. The recess can be designed in the manner of a groove or annular groove, which can be open towards the connecting and/or disconnecting direction of the joint elements or towards a direction transverse to it. The area of thinner material preferably extends in a direction that differs from the longitudinal direction of the cable-routing device. A positive fit over the complete circumference in at least a plane including the longitudinal axis of the cable-routing device is not interrupted as a result of this.

One or both of the joint elements of a link are preferably located on a brace, which may possibly bear a guide element, where the brace displays at least one opening extending in the longitudinal direction of the cable-routing device, which can optionally serve to accommodate a line or other device, such as an elastic element like a spring bar, extending over several links or the entire cable-routing device, which exerts an elastic restoring force to counteract the intended deflection of the cable-routing device from its stretched-out position, this being of advantage for applications in robotics, in particular. This can be realised with braces extending in different directions or of different designs. In this context, the braces can serve to partition the interior of the cable-routing device, dividing it into different guide channels, partly or completely separated from each other, even if they do not bear any guide elements. Where appropriate, both joint elements of a link can be located on a common brace. Where appropriate, several openings can be provided on a brace or a base in this context, in the circumferential direction and/or the radial direction of the cable-routing device.

In particular, the opening can be in front of the joint element in the connecting and disconnecting direction of the joint elements, meaning that, for connecting and/or disconnecting the pivoting joint, the respective joint element must be at least partially, or completely, positioned in the cross-sectional area of the opening. As a result, complete disconnection of the pivoting joint can be prevented by the optional installation of a line or other device, where tensile forces acting on the links are, however, largely or completely absorbed by the pivoting joint. This kind of installation of a line or device in the opening is also not absolutely necessary.

The brace can be designed in the manner of a base that supports the joint elements on one side only, and the brace can also be designed as a web, where the joint elements can be connected to several braces, where appropriate. Also, at least one brace can act on the pivoting joint, preferably two or more braces, which extend transverse to the connecting direction of the links and can, for example, enclose an angle of 60° or 90° with it, without being restricted to this.

Furthermore, the brace can be designed in such a way that connecting the pivoting joint necessitates at least partial insertion of the corresponding joint element into the brace, e.g. a base. In this context, areas of the brace can display a guide for the corresponding joint element or the link to be connected, where the guide can permit a greater or lesser amount of play for movement of the joint elements or links relative to each other, or constitute a guide that is essentially free of play. It goes without saying that, where appropriate, corresponding guide areas for connecting and/or disconnecting the links or the pivoting joints can also be provided on other cable-routing device designs.

For disconnecting the pivoting joint, the joint body receptacle, which can otherwise surround the joint body almost completely from this direction, is preferably provided with at least one opening that is preferably essentially opposite the receiving opening for insertion of the joint body, where a tool for disassembling the joint body can be inserted into the opening. Where appropriate, the pivoting joint can be released by applying linear pressure to the joint body with the tool. The opening is preferably provided with a shoulder, against which the tool can be positioned in the manner of a lever, so that the pivoting joint can be levered apart. Where appropriate, however, it is also possible to provide other contact surfaces for lever-type application of the tool. Where appropriate, the pivoting joint can also be disconnected by lever-type skewing of the links relative to each other when sufficient force is applied.

The pivoting joints are preferably of one-piece design and, particularly preferably, the links as a whole are of one-piece design, meaning that other connecting elements can be dispensed with.

The links preferably form tubular elements that are closed around the entire circumference, apart from slit-type openings for the insertion and removal of lines or the like, where appropriate, meaning that the links can be assembled to form a flexible tube that is closed around the entire circumference. The flexible tube is preferably closed around the entire circumference and over the entire length in all positions of the link joints. The links can, however, also be of a more or less open design, as long as reliable guidance of the lines within the cable-routing device is guaranteed.

At one or both ends, the links can display overlapping areas designed in the form of a section similar to a spherical cap, said section preferably extending around the entire circumference of the cable-routing device. The centre point of the spherical cap-like sections can coincide with the centre of the joint axis or the centre of the respective pivoting joint assigned to the end of the respective link. The spherical cap-like sections at the ends can be separated by a middle section. Independently of this, the joint axes are, in the longitudinal direction of the cable-routing device, located at the level of the centre points of the curvature of the spherical cap-like sections and/or at the level of the largest radial extension of the cap-like sections. The joint axes can be located in such a way that they pass through these sections with the largest radial extension, which can be realised structurally or be present in mental extrapolation of existing sections.

The links preferably display slit-like openings extending over the entire link length for the insertion or removal of lines, where the slit-like openings of adjacent links are located at the same level on the circumference, meaning that a continuous slit is provided over several links or over the entire length of the cable-routing device.

Particularly if the links form a tube closed around the entire circumference, the guide elements can be provided with openings, preferably closable openings, or predetermined breaking points, through which tools, especially screwdrivers or the like, can be inserted into the guide channel, so that the pivoting joints can be disconnected from the outside. The predetermined breaking points can be designed as film closures, perforations or the like and define an opening, so that a closed tube is present under normal conditions. The openings or predetermined breaking points are preferably located at the level of the pivoting joints in the longitudinal direction of the cable-routing device. In this context, when the cable-routing device is stretched out, overlapping areas of adjacent links can be provided with openings or predetermined breaking points that are aligned relative to each other, or the openings or predetermined breaking points can also be arranged in such a way that they are provided only on one link, such as the link lying radially outwards, and that it is possible to reach through into the interior of the cable-routing device when the links are in an angled position.

The openings or predetermined breaking points are preferably located in the plane of a fork-like element, where the two fork ends are located on different sides of the plane.

To limit the angling movement of adjacent links, the guide elements are preferably provided with stop areas, such as stop edges for flat contact of a corresponding stop of the adjacent link. Where appropriate, the stops can, however, additionally or alternatively be provided in the area of the pivoting joints lying radially inwards.

All links of the cable-routing device are preferably of identical design.

The pivoting joints are preferably designed in such a way that they can be disconnected independently of each other, completely disconnecting the cable-routing device. In this way, the cable-routing device can be dismantled into individual segments, the links of which are still connected to each other in pivoting fashion. The cable-routing device can preferably be disconnected at any desired point between adjacent links, for instance in order to be able to replace individual links. The remaining strand of the cable-routing device preferably remains unchanged in this context. To this end, suitable means for positive and/or non-positive locking can be provided on the pivoting joints that act solely between two adjacent links. The means for positive locking can, in particular, be designed as snap-in means.

BRIEF DESCRIPTION OF THE DRAWINGS

An example of the invention is described below and explained on the basis of the Figures. The Figures show the following:

FIG. 1 An arrangement of two assembled links of a cable-routing device according to the invention, in the longitudinal direction of the cable-routing device (FIG. 1a, 1b) and in two side views rotated through 90° about the longitudinal direction of the cable-routing device (FIG. 1c, 1d), FIG. 2 A cross-sectional view of the arrangement according to FIG. 1 along line A-A, FIG. 3 Perspective views (FIG. 3a, 3b) of two links according to FIG. 1, and corresponding sectional views (FIG. 3c, 3d), FIG. 4 Side views offset by 90° relative to each other in the longitudinal direction of the cable-routing device (FIG. 4a, 4b), an end view (FIG. 4c) and a sectional view (FIG. 4d) of a chain link of a further embodiment, FIG. 5 Various perspective views of a link according to FIG. 4 and a perspective sectional view of the same.

DETAILED DESCRIPTION OF THE INVENTION

Cable-routing device 1 according to the invention (FIGS. 1 to 3) comprises a plurality of links 2, which are open at the ends, joined together in pivoting fashion and can be angled relative to each other in at least two directions (see FIGS. 1, 2), and which, according to the practical example, each display rotationally symmetrical outer contours. Guide elements 3, lying radially outwards, border the outside of guide channel 4, which is almost completely closed in this instance. According to the practical example, the guide elements form sections of the body of rotation that extend over the entire length of the links. Adjacent guide elements 3 are separated by slits 5, which extend over the entire length of the links and through which lines can be inserted into, or removed from, the guide channel. In this context, the links are mounted on each other in such a way that, in a selected arrangement of the cable-routing device, e.g. when the cable-routing device is stretched out, the slits of adjacent links run into one other, meaning that the entire cable-routing device displays a slit extending over its full length (FIG. 3a).

The pivoting joints of the links are formed by joint elements 6, 7, which are designed in such a way that, in order to connect and/or disconnect the respective pivoting joint, the links 2 to be connected to each other and/or disconnected from each other can be brought together and/or separated in a direction 8 that encloses an angle relative to longitudinal axis 9 of the cable-routing device, which is present when the cable-routing device is stretched out. According to the practical example, the adjacent links have to be moved towards or away from each other at an angle of roughly 75° for this purpose, where the movement can be supported by, or combined with, swivelling movement of the links relative to each other. At the start of disconnection and/or at the end of the connecting procedure, the adjacent links and the joint elements have to be moved essentially through 90° relative to each other and to longitudinal axis 9 of the cable-routing device.

Joint elements 6 and 7 of the practical example are designed as a corresponding joint ball and ball socket. Receptacle 10 of the ball socket displays a longitudinal axis 11, which corresponds to the neutral position of the joint ball, which is provided with a fastening area 12 and is located in the receptacle. Longitudinal axis 11 of the receptacle thus likewise encloses an angle relative to longitudinal axis 9 of the cable-routing device, this angle being 90° according to the practical example. Due to the inclination of the joint body receptacle or the ball socket, the corresponding joint element, which is shown as a joint ball here, makes contact with area 13 of the receptacle when tensile force or thrust is applied in the longitudinal direction of the cable-routing device, said area 13 enclosing the joint element around the entire circumference in a plane including the longitudinal axis of the cable-routing device. As a result, high tensile and/or thrust forces acting in the longitudinal direction of the cable-routing device can be absorbed by the pivoting joints. The same would also apply if the inclination of the ball socket and the joint ball, or other types of joint elements, differed from the orthogonal arrangement illustrated here.

Longitudinal axis 6a of ball-like joint element 6, which runs through the centre of the ball and fastening area 12 of the joint element in this case, is likewise perpendicular to longitudinal axis 9 of the cable-routing device in this context. It goes without saying that, where appropriate, the angles between the longitudinal axis of joint body 6 and receptacle 10 that these enclose with longitudinal axis 9 of the cable-routing device can also be different from each other.

Ball-like joint element 6 and ball socket-like joint element 7 are each mounted on a web-like area located on a base 16, which bears a guide element 3 that extends virtually over the entire circumference of the cable-routing device. In this context, web-like areas 15a,b (FIG. 3d) are offset relative to each other in a direction perpendicular to longitudinal axis 9 of the cable-routing device. Web-like areas 15a,b, the end area of the ball socket and the joint ball thus create essentially z-shaped, mutually engaging connecting elements that are capable of absorbing high tensile forces, where it goes without saying that this can also be realised using other joint elements, such as by appropriately arranged, pin-like joint elements and corresponding receptacles.

According to the practical example, joint elements 6, 7 are connected in snap-in fashion. To facilitate disassembly of the links, groove 17 is provided around receptacle 10, being designed in this case as an annular groove and open towards receiving opening 18.

Below joint elements 6, 7, base 16 displays opening 19 for accommodating lines or other devices, such as spring bars extending over several links, below which another opening 20 is provided, where all openings 19, 20 are aligned with each other when the cable-routing device is stretched out. Openings 19, 20 are closed over the entire circumference, but they can also be laterally open independently of each other.

To facilitate connection of the pivoting joint, guide 21 is provided on base 16 in the form of a web extending transversely to the connecting or disconnecting direction. Therefore, to connect the links, ball-like joint element 6 can be positioned roughly on the side of guide 21 facing receptacle 10 and subsequently snapped into receptacle 10. During the connecting procedure, the cross-section of ball-like joint element 6 partly or completely covers opening 19. Thus, lines or devices can be inserted through openings 19, 20 when the cable-routing device is assembled, where they do not absorb, or have to absorb, any tensile forces in the longitudinal direction of the cable-routing device.

To facilitate disconnection of the links, socket-like joint element 7 is provided with slit-like opening 22, into which a tool can be inserted from outside the cable-routing device and pressed against the ball-like joint element, thereby disassembling the same. To this end, closable openings or closed areas provided with predetermined breaking points can be provided in guide elements 3, where appropriate, or the guide elements can also expose an area between them in a certain position. Where appropriate, the tool can also be inserted through slit 5. In this context, opening 22 displays shoulder 23, against which the tool can be positioned in the manner of a lever and thus essentially pressed against the apex of ball-like joint element 6.

The links form an essentially closed tube (see FIG. 3a), for which purpose both ends of the links display overlapping end areas 25, which are designed in the form of spherical cap sections and can also be separated by a middle section, where appropriate. The end areas reach into each other in this context. Joint elements 6, 7 project axially from the end areas. Independently of this, joint axes 6a, 11 of joint areas 6, 7 are located, in the longitudinal direction of the cable-routing device, at the level of the centre points of the curvature of the spherical cap sections, or pass through the spherical cap sections in the areas of maximum diameter. On the whole, guide elements 3 extend over the entire circumference of the cable-routing device, except for slits 5. It goes without saying that, where appropriate, the slits can also display a greater width. Where appropriate, the end areas of the links can also display a different form, provided that angling movement of the links relative to each other about the joint axes is enabled.

The practical example according to FIGS. 4 and 5 represents a modified version of the practical example in FIGS. 1 to 3, identical features having identical reference numbers. This practical example essentially differs in that the joint elements are connected to the guide elements.

According to this practical example, joint elements 6, 7, which are designed in accordance with the elements of the first practical example, are connected to guide elements 3, lying radially outwards, by at least one brace 30. In this context, the two opposite braces 30 are arranged transverse to connecting direction or disconnecting direction 8 of the links and are perpendicular thereto. The two braces form two guide channels 4a. Braces 30 are provided with openings 31, through which lines or other devices, such as the aforementioned spring bars, can optionally be passed. Braces 30 taper radially outwards.

Braces 30, like base 16 in FIGS. 1 to 3, are predominantly, or almost exclusively according to the practical examples, fastened to only one of the cap-like end areas of links 2. Where appropriate, a middle section can be provided between the cap-like end areas to increase the length of the links.

To limit the pivoting position of links 2 joined together in pivoting fashion, the outer sides of guide elements 3, or their face ends, can act as stops 3a or, where appropriate, the areas of base 16 or braces 30 adjacent to guide elements 3 can also serve as stops, particularly if more than two braces are provided.

Cable-routing device

List of reference numbers

| | |
|---|---|
| 1 | Cable-routing device |
| 2 | Link |
| 3 | Guide element |
| 3a | Stop |
| 4, 4a | Guide channel |
| 5 | Slit |
| 6 | Joint element |
| 6a | Longitudinal axis |

-continued

Cable-routing device

List of reference numbers

| | |
|---|---|
| 7 | Joint element |
| 8 | Direction |
| 9 | Longitudinal axis of the cable-routing device |
| 10 | Receptacle |
| 11 | Longitudinal axis |
| 12 | Fastening area |
| 13 | Area |
| 14 | Longitudinal axis of the joint element |
| 15 | Web-like area |
| 16 | Base |
| 17 | Groove |
| 18 | Receiving opening |
| 19, 20 | opening |
| 21 | Guide |
| 22 | Opening |
| 23 | Shoulder |
| 25 | End area |
| 30 | Brace |
| 31 | Opening |

The invention claimed is:

1. Cable-routing device comprising links that are open at the ends, joined together in pivoting fashion and can be angled relative to each other in at least two directions, said links being arranged one behind the other in the longitudinal direction of the cable-routing device and forming at least one guide channel by means of guide elements located radially outwards, where tensile force-absorbing pivoting joints are located between links joined together in pivoting fashion within the cable-routing device and the links each display corresponding joint elements, characterized in that at least one of said pivoting joints is designed in such a way that, in order to form and/or disconnect the pivoting joint, the respective links and/or joint elements to be joined to one another and/or disconnected from one another can be joined and/or separated in a direction that differs from the longitudinal axis of the cable-routing device, further characterized in that the direction for connecting the links and/or the joint elements to form the pivoting joint and/or for disconnecting the pivoting joint encloses an angle of 45° to 135° with the longitudinal axis of the cable-routing device.

2. Cable-routing device according to claim 1, characterized in that the joint elements of links joined together in pivoting fashion can be designed as a joint body, particularly a joint ball, and a joint body receptacle, particularly a ball socket.

3. Cable-routing device according to claim 2, characterized in that the joint axes of one or both joint elements are transverse to the longitudinal axis of the cable-routing device.

4. Cable-routing device according to claim 2, characterized in that at least one recess is provided adjacent to a receiving opening for the joint body in the joint body receptacle, extending in its longitudinal direction at least partially around the circumference of the receptacle.

5. Cable-routing device according to claim 2, characterized in that the joint body receptacle is provided with an opening, into which a tool for disassembling the joint body can be inserted.

6. Cable-routing device according to claim 5, characterized in that the opening displays a shoulder, a distance away from the inside of the joint body receptacle, against which a tool can be positioned in the manner of a lever.

7. Cable-routing device according to claim 1, characterized in that the joint elements are each supported by a support and the supports of the two joint elements of a link are offset relative to each other in a direction perpendicular to the longitudinal axis of the cable-routing device.

8. Cable-routing device according to claim 1, characterized in that the pivoting joint is a snap-in connection.

9. Cable-routing device according to claim 1, characterized in that links are provided that are provided with at least one brace, extending transverse to the longitudinal direction of the cable-routing device and bearing a guide element, and in that the brace displays at least one opening extending in the longitudinal direction of the cable-routing device, which can optionally serve to accommodate a line or other device within the cable-routing device.

10. Cable-routing device according to claim 9, characterized in that the brace is designed as a base.

11. Cable-routing device according to claim 1, characterized in that the links each display only one guide element, which extends at least around almost the entire circumference of the cable-routing device.

12. Cable-routing device according to claim 1, characterized in that the links are of one-piece design.

13. Cable-routing device according to claim 1, characterized in that the links form a tubular section that is closed around the entire circumference, apart from at least one slit-type opening extending over the entire length of the link, where appropriate.

14. Cable-routing device according to claim 1, characterized in that the links display a rotationally symmetrical envelope and end areas, overlapping in the longitudinal direction of the cable-routing device, that are designed as spherical cap-like sections.

15. Cable-routing device according to claim 1, characterized in that at least one, or all, of the pivoting joints can be disconnected independently of other pivoting joints, completely disconnecting the cable-routing device.

16. Cable-routing device according to claim 1, characterized in that at least one guide element of a link displays at least one, preferably closable, opening or predetermined breaking point for radially inward insertion of a tool into the cable-routing device for disconnecting at least one pivoting joint of the link.

17. Cable-routing device according to claim 1 characterized in that said links are not separable along said longitudinal axis of the cable-routing device.

* * * * *

UNITED STATES PATENT AND TRADEMARK OFFICE
CERTIFICATE OF CORRECTION

PATENT NO. : 7,439,446 B2  Page 1 of 1
APPLICATION NO. : 10/552427
DATED : October 21, 2008
INVENTOR(S) : Blase et al.

It is certified that error appears in the above-identified patent and that said Letters Patent is hereby corrected as shown below:

On the title page, item (57), under "Abstract", in column 2, line 3, after "angled" delete "-".

On the title page, item (57), under "Abstract", in column 2, line 20, after "device." insert -- (FIG. 2) --.

In column 9, line 43, in Claim 1, delete "device." and insert -- device to absorb said tensile force. --, therefor.

Signed and Sealed this

Seventh Day of July, 2009

JOHN DOLL
*Acting Director of the United States Patent and Trademark Office*